(12) United States Patent
Suzuki (10) Patent No.: US 9,139,025 B2
(45) Date of Patent: Sep. 22, 2015

(54) MEASUREMENT APPARATUS, PRINTING APPARATUS AND CONTROL METHOD

(71) Applicant: CANON KABUSHIKI KAISHA, Tokyo (JP)

(72) Inventor: Takumi Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/278,219

(22) Filed: May 15, 2014

(65) Prior Publication Data

US 2014/0368566 A1    Dec. 18, 2014

(30) Foreign Application Priority Data

Jun. 13, 2013    (JP) ................................ 2013-125007

(51) Int. Cl.
*B41J 11/00* (2006.01)
*B41J 29/393* (2006.01)
*G01B 21/06* (2006.01)
*G01B 11/04* (2006.01)

(52) U.S. Cl.
CPC ............ *B41J 11/0095* (2013.01); *B41J 11/003* (2013.01); *G01B 11/046* (2013.01)

(58) Field of Classification Search
CPC ...................................................... B41J 11/003
USPC ............................................ 347/19; 702/187
See application file for complete search history.

(56) References Cited

U.S. PATENT DOCUMENTS

| | | | |
|---|---|---|---|
| 6,415,244 B1 * | 7/2002 | Dickens et al. ................ | 702/187 |
| 2002/0191952 A1 * | 12/2002 | Fiore et al. ....................... | 386/46 |
| 2004/0114984 A1 * | 6/2004 | Nakano ........................... | 400/708 |
| 2004/0141782 A1 * | 7/2004 | Kato ................................. | 400/61 |
| 2007/0229644 A1 * | 10/2007 | Koyama et al. ................ | 347/194 |
| 2012/0218568 A1 * | 8/2012 | Yorimoto et al. .............. | 358/1.5 |

FOREIGN PATENT DOCUMENTS

JP        2006-240138 A    9/2006

* cited by examiner

*Primary Examiner* — Shelby Fidler
(74) *Attorney, Agent, or Firm* — Fitzpatrick, Cella, Harper & Scinto (57) ABSTRACT

A carriage including a sensor scans a printing medium, and a measurement value measured by the sensor is stored in a memory over the scanning range. When a predetermined event occurs, storage control for storing the measurement value in the memory is performed.

6 Claims, 7 Drawing Sheets

MEASUREMENT APPARATUS, PRINTING APPARATUS AND CONTROL METHOD

BACKGROUND OF THE INVENTION

1. Field of the Invention

The present invention relates to a measurement apparatus for measuring a state of a printing medium, a printing apparatus, and a control method.

2. Description of the Related Art

An inkjet printing apparatus includes a function for detecting the position of an end portion of a printing medium in order to form an image on the printing medium properly. However, depending on the printing medium, its end portion can be in an inappropriate state to print, thus being unable to print an image properly. The inappropriate state refers to a state in which, for example, there is damage to the printing medium such as a stain, tear, or wrinkle of its leading end portion, or a frame line or the like is printed near the end portion.

To solve this problem, a method of detecting, using a reflective photosensor, whether an end portion of a printing medium floats based on a profile showing the relationship between a reflected light amount and a position (Japanese Patent Laid-Open 2006-240138) is known.

According to Japanese Patent Laid-Open 2006-240138, all measurement values in the measurement range of the reflective photosensor are stored in a memory. Therefore, a capacity for storing the measurement values of the printing medium (measurement target object) over the entire measurement range needs to be reserved.

SUMMARY OF THE INVENTION

An aspect of the present invention is to eliminate the above-mentioned problems with the conventional technology. The present invention provides a printing apparatus which reduces a capacity for storing measurement values and a control method.

The present invention in one aspect provides a measuring apparatus comprising: a sensor; a scanning unit configured to cause the sensor to scan a measurement target object; a memory including a plurality of memory areas configured to be able to store a first number of measurement values measured by the sensor, in each of the plurality of memory areas; and a storing unit configured to store, every time a predetermined event occurs for the measurement value measured by the sensor, the first number of measurement values that are measured before and after the event in one of the plurality of memory areas, wherein the storing unit stores the measurement value measured by the sensor in the one memory area by the time the event occurs, and a second number of measurement values which is smaller than the first number in the one memory area and a next storing target memory area after the event has occurred.

According to the present invention, it is possible to reduce the capacity for storing measurement values.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same components have the same reference numerals, and a description thereof will be omitted.

First Embodiment

Figure 1:
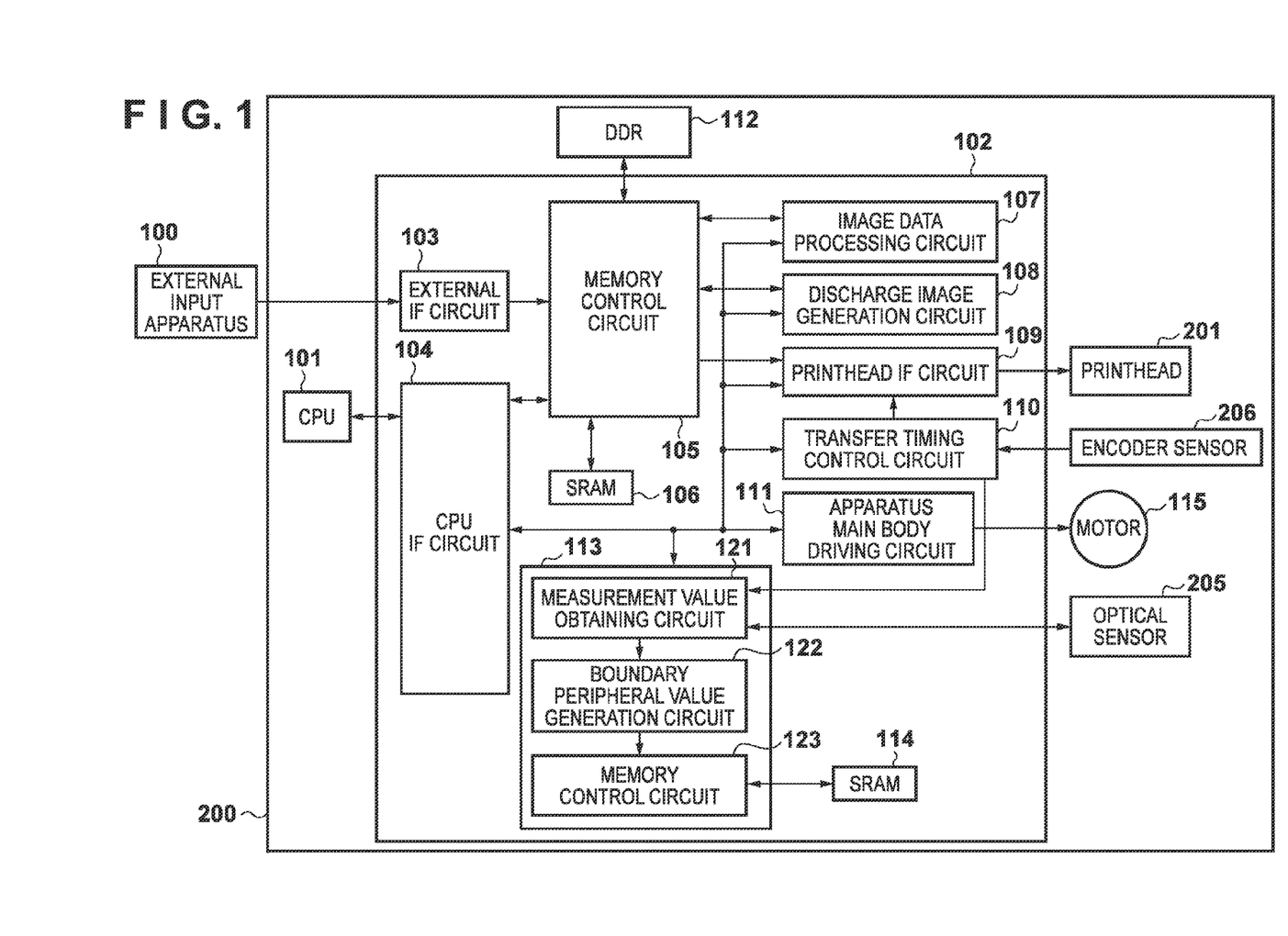
FIG. 1 is a schematic view showing the arrangement of an inkjet printing apparatus.

FIG. 1 is a view showing the schematic arrangement inside an inkjet printing apparatus according to the first embodiment. An external input apparatus 100 can communicate with an inkjet printing apparatus 200 and is, for example, a PC. A CPU 101 controls the entire inkjet printing apparatus 200. An ASIC 102 executes hardware control unique to a printer, such as printhead control. The ASIC 102 includes an external interface circuit 103, a CPU interface circuit 104, a memory control circuit 105, and an SRAM 106. The ASIC 102 also includes an image data processing circuit 107, a discharge image generation circuit 108, a printhead interface circuit 109, a transfer timing control circuit 110, an apparatus main body driving circuit 111, a boundary peripheral value control circuit 113, and an SRAM 114 (an example of a storing unit).

An operation of the ASIC 102 will be described. The external interface circuit 103 is connected to the external input apparatus 100. The external interface circuit 103 includes various interface circuits such as an USB interface circuit, a LAN interface circuit, and an IDE interface circuit which are connected to the external input apparatus 100. The CPU interface circuit 104 is connected to the CPU 101, and the CPU 101 controls other blocks through the CPU interface circuit 104.

The memory control circuit 105 is connected to the external interface circuit 103, the SRAM 106, the image data processing circuit 107, the discharge image generation circuit 108, the printhead interface circuit 109, and a DDR (Double Data Memory) 112. The DDR 112 is a DDR memory. The memory control circuit 105 transfers image data input from the external input apparatus 100 to the SRAM 106. Also, the memory control circuit 105 performs control of reading data from and writing it in the SRAM 106 and the DDR 112. The SRAM 106 is also used as a work buffer. For example, print target image data is divided into a specific size and stored. The SRAMs 106 as many as ink colors or nozzles may be arranged.

The image data processing circuit 107 performs various image processes on image data stored in the SRAM 106. Examples of image processes include a boundary process, an edge process, an HV conversion process, a smoothing process, and a non-discharge correction process. The discharge image generation circuit 108 converts the image data having undergone the image process into a data format (to be referred to as discharge image data hereinafter) to be discharged from a nozzle of a printhead 201. The transfer timing control circuit 110 generates a transfer timing signal to the printhead 201 for the discharge image data by multiplying a signal input from an encoder sensor 206. This transfer timing control circuit 110 counts the signal input from the encoder sensor 206, and generates a position information signal. The printhead interface circuit 109 transfers the discharge image data to the printhead 201 in response to the generated transfer timing signal. The DDR 112 is a reception buffer attached externally to the ASIC 102. The DDR 112 stores image data having undergone an image correction process. The apparatus main body driving circuit 111 controls each hardware device inside the inkjet printing apparatus 200. The apparatus main body driving circuit 111 controls, for example, a motor 115 which drives a conveyance roller or the like, and a sensor (not shown) or the like which detects the presence/absence of a printing medium on a conveyance path.

The boundary peripheral value control circuit 113 includes a measurement value obtaining circuit 121, a boundary peripheral value generation circuit 122, and a memory control circuit 123. The boundary peripheral value control circuit 113 receives a reflected light amount detected by an optical sensor 205 and the position information signal from the transfer timing control circuit 110. The optical sensor 205 is, for example, a reflective photosensor which is arranged on the side surface of a carriage, and used with the reflected light amount to measure a sheet distance and detect the end portion. The sheet distance refers to a distance between the printhead 201 and the surface of the printing medium. By measuring the sheet distance at a plurality of points in the scanning direction of the carriage, a floating state of the printing medium or the like can be detected. Note that a measurement target object detected by the optical sensor 205 is not limited to a printing medium, but may be the surface of a conveyance unit for conveying the printing medium.

The CPU 101 sets, for the boundary peripheral value control circuit 113, a measurement section for detecting the side end portion of the printing medium, a threshold (also referred to as a reference value) which is used for measurement, a threshold direction (to be described later), a storage timing (storage cycle) of a measurement value in the SRAM 114, and a boundary peripheral value storage count (to be described later). The measurement value represents a value of the reflected light amount detected by the optical sensor 205. Assuming that an A/D-converted (converted from analog data to digital data) digital value falls within a range of, for example, 0 to 1,023, the value of the reflected light amount is input to the boundary peripheral value control circuit 113 every 40 μs. Furthermore, the position information signal is input from the transfer timing control circuit 110 to the boundary peripheral value control circuit 113 every 0.5 ms. The threshold is set when detecting the end portion of the printing medium. The value of the reflected light amount without the printing medium, the value of the reflected light amount which can be determined that there is no printing medium, the value of the reflected light amount when the printing medium has the largest thickness, and the like are used for the threshold. The threshold direction indicates that the measurement value becomes smaller or larger than the threshold. In either case, the measurement value is changed across the threshold at each point. In the first embodiment, the CPU 101 defines a case in which the measurement value is determined to have changed across the threshold.

Figure 3A:
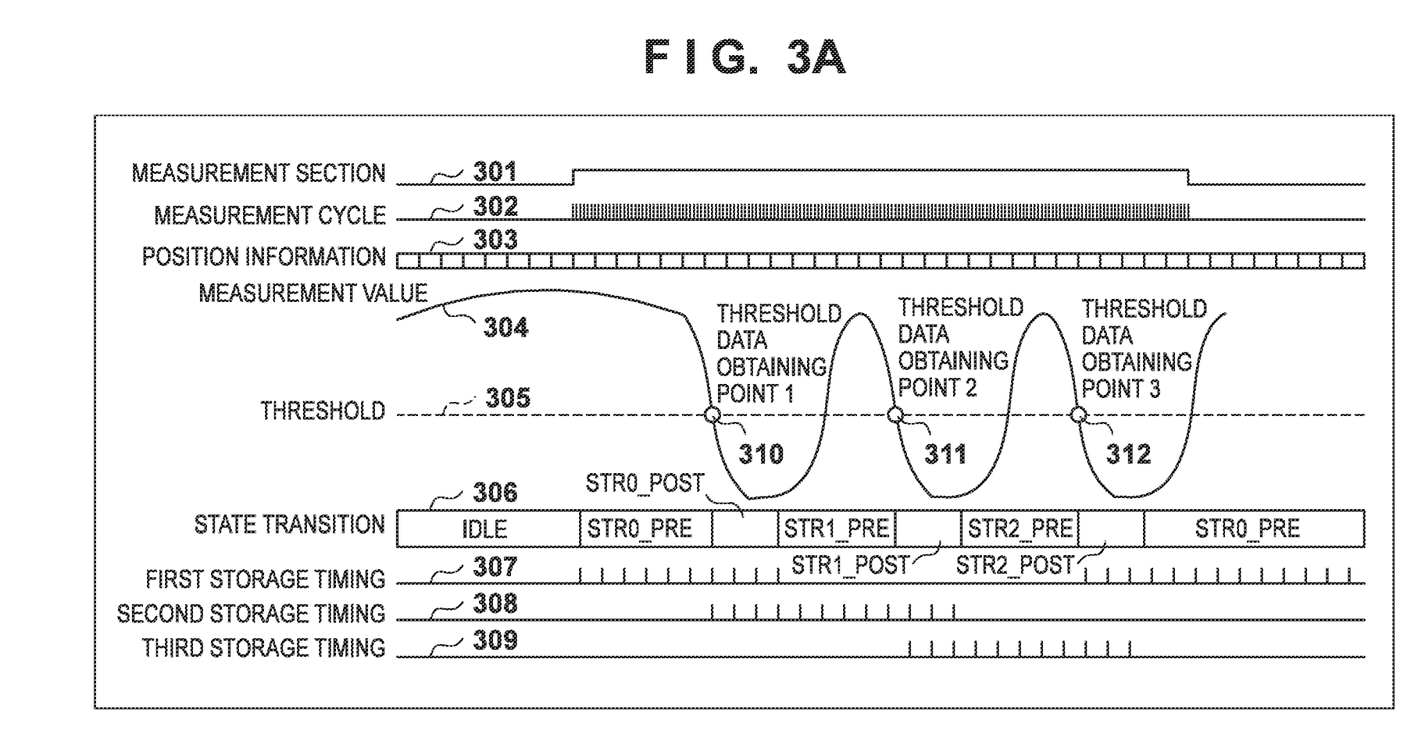
FIGS. 3A and 3B are charts showing timing charts and state transitions.
Figure 3B:
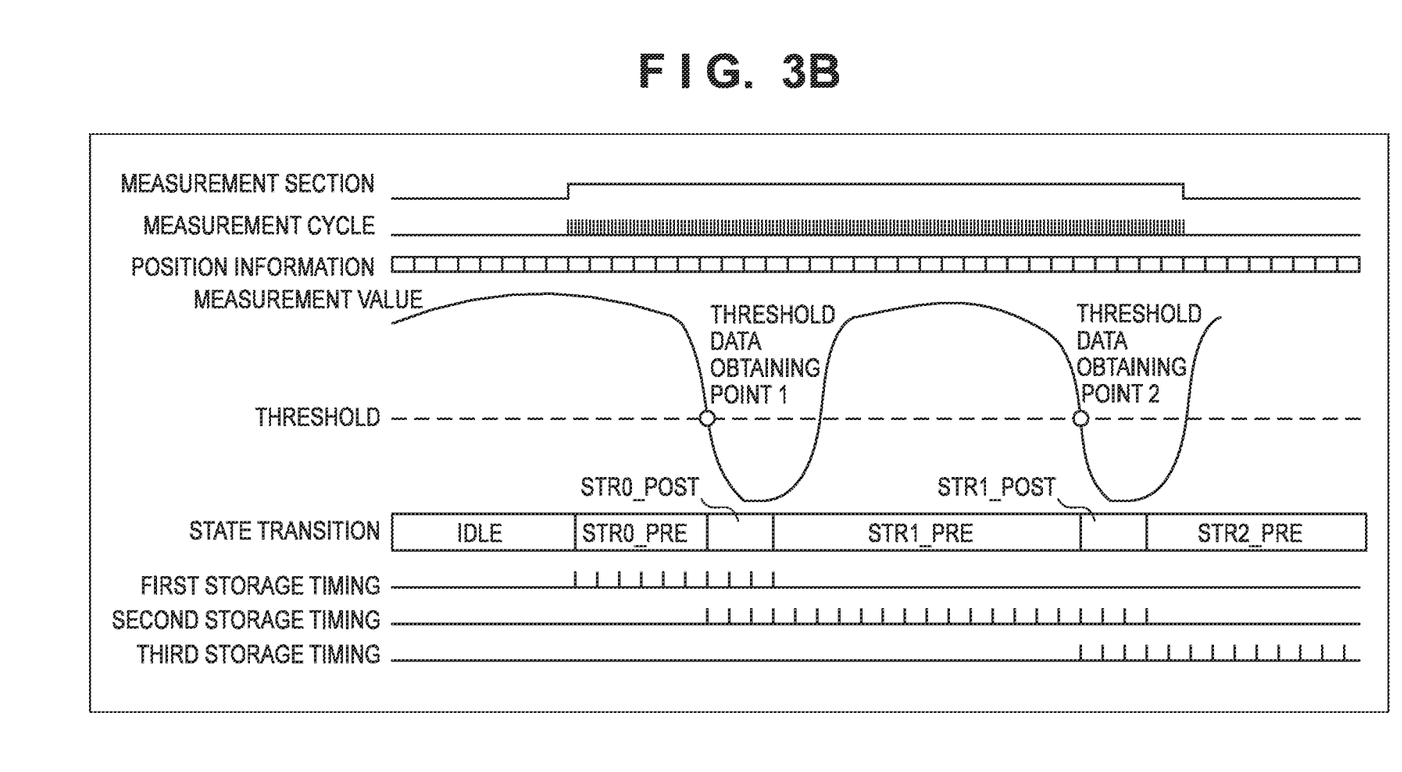

The measurement value obtaining circuit 121 instructs, based on the position information signal, to start/stop driving the boundary peripheral value control circuit 113 and the optical sensor 205. The measurement value obtaining circuit 121 also calculates the measurement value from the digital value input from the optical sensor 205. Filter processing may be performed in order to suppress variations in the digital value influenced by noise or the like. In the filter processing, for example, the moving average value of a plurality of digital values may be used as a measurement value. Furthermore, the measurement value obtaining circuit 121 detects whether the measurement value has changed across the threshold. The threshold is set by the CPU 101. When detecting the change in measurement value across the threshold, the measurement value obtaining circuit 121 notifies the boundary peripheral value generation circuit 122 of this. More specifically, when an event in which the measurement value has changed across the threshold occurs, the measurement value obtaining circuit 121 notifies the boundary peripheral value generation circuit 122 of this. The boundary peripheral value generation circuit 122 manages a state (to be described later) of the boundary peripheral value control circuit 113. In addition, the boundary peripheral value generation circuit 122 holds the measurement value in response to the storage timing set by the CPU 101 and transfers it to the memory control circuit 123. In the following description, the measurement value which is held in response to the storage timing will specifically be referred to as a "boundary peripheral value". The state of the boundary peripheral value control circuit 113 is managed based on the detection of the change in measurement value across the threshold from the measurement value obtaining circuit 121 and the number of stored boundary peripheral values. The management of the state of the boundary peripheral value control circuit 113 will be described later with reference to FIG. 3A. FIGS. 3A and 3B are charts for explaining measurement at one end portion (that is, the right end or the left end) of the end portions on both sides (the scanning direction of the carriage) of the printing medium.

The memory control circuit 123 stores, in response to the storage timing signal, the boundary peripheral value transferred from the boundary peripheral value generation circuit 122 in a predetermined memory area of the SRAM 114. A storage control method of the boundary peripheral value will be described later with reference to FIG. 4.

In the first embodiment, the SRAM 114 has three areas for storing the boundary peripheral value (memory areas). In the following description, respective areas within the SRAM 114 are referred to as the first storing area (first memory area), the second storing area (second memory area), and the third storing area (third memory area), respectively. Storage in the first storing area of the SRAM 114 is performed in response to the first storage timing signal. Storage in the second storing area of the SRAM 114 is performed in response to the second storage timing signal. Storage in the third storing area of the SRAM 114 is performed in response to the third storage timing signal. The first to third storage timing signals are generated in accordance with a state change in the boundary peripheral control circuit 113. The first to third storage timing signals are generated in the boundary peripheral value generation circuit 122.

Figure 2:
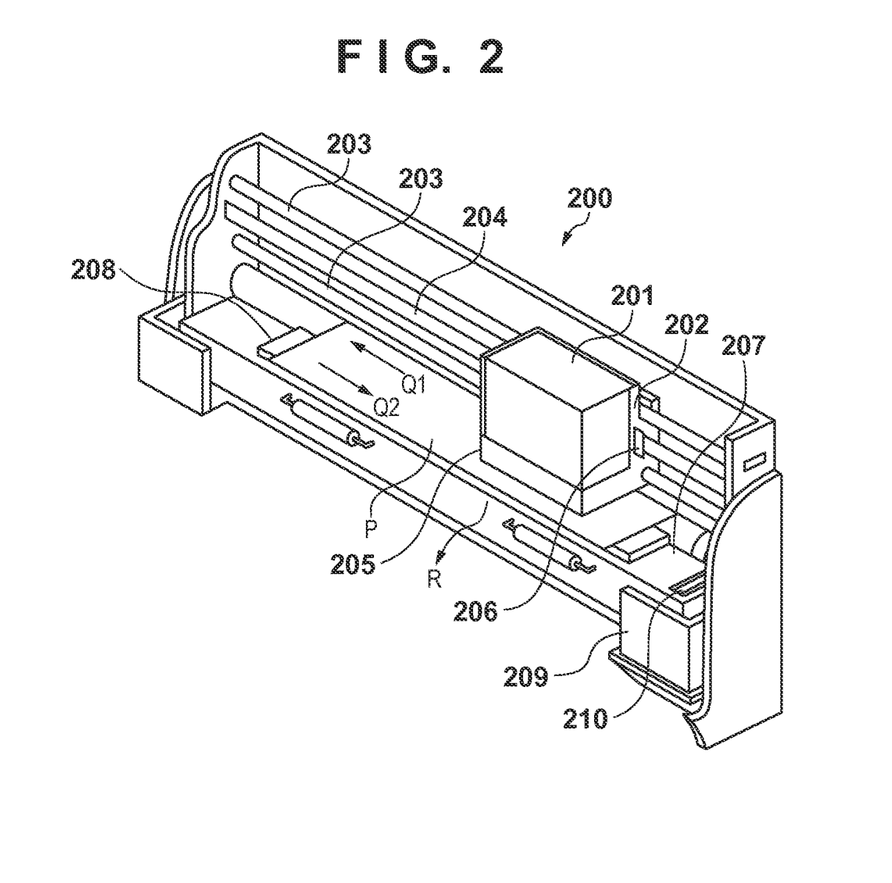
FIG. 2 is a schematic view showing the peripheral structure of a printhead of the inkjet printing apparatus.

FIG. 2 is a schematic view showing the peripheral structure of a printhead of the inkjet printing apparatus 200. The printhead 201 has one or a plurality of nozzles which discharge ink. The printhead 201 is mounted on a carriage 202 and scanned in a main scanning direction which crosses a printing medium P conveyance direction, thereby printing on the printing medium P. Each carriage shaft 203 functions as a guide shaft when the carriage 202 is scanned. An encoder film 204 is used to obtain position information when setting a printing timing by the printhead 201. The optical sensor 205 is provided on the side surface of the carriage 202, and used by using the reflected light amount to measure the sheet distance and detect the end portion of the printing medium. A recovery apparatus 209 performs recovery processing of the printhead 201 such as capping of the printhead 201 or wiping of the ink discharge surface of the nozzle. A printhead cap 210 caps the nozzle of the printhead 201 to cover, thereby preventing ink from drying.

When a printing operation starts with the above-described arrangement, the printing medium P is fed to a feed position by a feed roller (not shown), and conveyed to a predetermined printing start position by a conveyance roller 207. The printing medium P conveyed to a printable area by the conveyance roller 207 is supported by a platen 208 from below. The carriage 202 reciprocally moves, by the carriage motor (motor 115), a scanning range including a printing area along the main scanning direction indicated by arrows Q1 and Q2. During the reciprocating movement, the printhead 201 mounted on the carriage 202 discharges ink from the nozzle toward the printing medium P positioned below, thereby performing printing of one scan. When one main scan has ended, the printing medium P is conveyed by a predetermined amount in a sub scanning direction indicated by an arrow R, and waits for a next main scan. By repeating above-described main scan and sub scan, printing is performed on one sheet of printing medium. At that time, the sheet distance is measured by the optical sensor 205 mounted on the carriage 202. A slit on the encoder film 204 is read by the encoder sensor 206 mounted on the carriage 202, and a signal is output from the encoder sensor 206 to the transfer timing control circuit 110 in accordance with the movement of the carriage. Based on the measurement value and the position information, control of the printing timing by the printhead 201 and determination of the state of the printing medium are performed.

FIGS. 3A and 3B are timing charts for storing the boundary peripheral value in the SRAM 114 and state transitions of the boundary peripheral value control circuit 113. In FIG. 3A, a signal 301 is a measurement section signal indicating a measurement section in which a reflected light amount is measured by the optical sensor 205 mounted on the carriage 202. A signal 302 is a measurement cycle signal indicating a measurement cycle of the reflected light amount. A signal 303 is a position information signal indicating position information of the current carriage 202 which is input from the transfer timing control circuit 110. A signal 304 is a signal indicating a measurement value which is measured by the optical sensor 205. A signal 306 is a state transition signal indicating the state transition of the boundary peripheral value control circuit 113 which is managed in the boundary peripheral value generation circuit 122. A signal 307 is the first storage timing signal indicating the storage timing in the first storing area of the SRAM 114. A signal 308 is the second storage timing signal indicating the storage timing in the second storing area of the SRAM 114. A signal 309 is the third storage timing signal indicating the storage timing in the third storing area of the SRAM 114. The cycles of the first to third storage timing signals are the same. A threshold 305 is a value set by the CPU 101 when detecting the end portion of the printing medium as described above. The threshold direction indicates a case in which the measurement value becomes smaller than the threshold. In that case, it is determined that the measurement value has changed across the threshold. Points 310, 311, and 312 are points at which the measurement values change across the threshold, and referred to as "threshold data obtaining points" hereinafter. In FIG. 3A, a threshold data obtaining point 1 corresponds to the point 310; a threshold data obtaining point 2, the point 311; and a threshold data obtaining point 3, the point 312, respectively. These "threshold data obtaining points" are the points at which events in which the measurement values have changed across the threshold occur. The event in which the measurement value has changed across the threshold is referred to as a predetermined event.

First, when the position information input from the transfer timing control circuit 110 indicates a preset measurement position, the measurement section signal 301 changes to high level (H). In addition, the signal 306 changes from an IDLE state to an STR0_PRE state. The IDLE state refers to an initial state of the boundary peripheral value control circuit 113. The STR0_PRE state refers to a state in which the measurement value can be stored in the first storing area of the SRAM 114 before reaching the threshold data obtaining point. The digital value is input from the optical sensor 205 in a cycle of the signal 302 at high level. The measurement value is generated by the measurement value obtaining circuit 121. Moreover, the first storage timing signal is generated, and stored, in a predetermined cycle, in the first storing area of the SRAM 114 with the measurement value being the boundary peripheral value.

When the measurement value reaches the threshold data obtaining point 1, the measurement value and the position information up to that point are stored, as threshold data, in the first storing area of the SRAM 114. The position information and the measurement value corresponding to that position information are stored at each address of the first storing area of the SRAM 114. Note that the measurement value and the position information need not be stored at the same address, but may be stored in different memory areas as long as they are associated with each other. Furthermore, in order to reduce a data amount to be stored in the SRAM 114, a configuration for storing one representative position information to be stored in the first storing area can be used. The boundary peripheral value generation circuit 122 changes the boundary peripheral value control circuit 113 from the STR0_PRE state to an STR0_POST state, and also changes the signal 306. The STR0_POST state refers to a state in which the measurement value can be stored in the first storing area of the SRAM 114 up to a predetermined number after reaching the threshold data obtaining point 1. The number of measurement values which can be stored in the first storing area in the STR0_POST state is determined by the boundary peripheral value storage count which is set in the first storing area. In addition to the first storage timing signal, the second storage timing signal starts to be output in the predetermined cycle. Hence, at this point, the measurement values are stored in both the first storing area and the second storing area of the SRAM 114.

When the measurement values corresponding to the boundary peripheral value storage count are stored in the first storing area after the measurement value reaches the threshold data obtaining point 1, the boundary peripheral value generation circuit 122 changes the boundary peripheral value control circuit 113 from the STR0_POST state to an STR1_PRE state. Then, the boundary peripheral value generation circuit 122 disables the first storage timing signal 307, thereby stopping storage in the first storing area. The STR1_PRE state refers to a state in which the measurement value can be stored in the second storing area of the SRAM 114 before reaching the threshold data obtaining point 2. When changing the state to this STR1_PRE state, the measurement value in the STR0_POST state followed by the STR1_PRE state is stored in this second storing area. Hence, in this STR1_PRE state, measurement values are sequentially stored at addresses subsequent to the address at which the measurement value was stored last in the STR0_POST state. An STR2_PRE state shown in FIG. 3 refers to a state in which the measurement value can be stored in the third storing area of the SRAM 114 before reaching the threshold data obtaining point 3. When changing the state to this STR2_PRE state, the measurement value in the STR1_POST state followed by the STR2_PRE state is stored in this third storing area. Hence, in this STR2_PRE state, each measurement values are sequentially stored at addresses subsequent to the address at which the measurement value was stored last in the STR1_POST state. The STR1_POST state refers to a state in which a predetermined number of measurement values can be stored in the second storing area of the SRAM 114 after the measurement value reaches the threshold data obtaining point 2. An STR2_POST state refers to a state in which a predetermined number of measurement values can be stored in the third storing area of the SRAM 114 after the measurement value reaches the threshold data obtaining point 3. When the measurement value reaches the threshold data obtaining point 2, the measurement value and the position information up to that point are stored, as threshold data, in the second storing area of the SRAM 114. The boundary peripheral value generation circuit 122 changes the boundary peripheral value control circuit 113 from the STR1_PRE state to the STR1_POST state, and also changes the signal 306. The number of measurement values which can be stored in the first storing area in the STR1_POST state is determined by the boundary peripheral value storage count which is set in the second storing area. In addition to the second storage timing signal, the third storage timing signal starts to be output in the predetermined cycle. Hence, at this point, the measurement values are stored in both the second storing area and the third storing area of the SRAM 114.

When the measurement values corresponding to the boundary peripheral value storage count are stored in the second storing area after the measurement value reaches the threshold data obtaining point 2, the boundary peripheral value generation circuit 122 changes the boundary peripheral value control circuit 113 from the STR1_POST state to the STR2_PRE state. Then, the boundary peripheral value generation circuit 122 disables the second storage timing signal 308, thereby stopping storage in the second storing area.

When the measurement value reaches the threshold data obtaining point 3, the measurement value and the position information up to that point are stored, as threshold data, in the third storing area of the SRAM 114. The boundary peripheral value generation circuit 122 changes the boundary peripheral value control circuit 113 from the STR2_PRE state to the STR2_POST state. The STR2_POST state refers to a state in which a predetermined number of measurement values can be stored in the third storing area of the SRAM 114 after the measurement value reaches the threshold data obtaining point 3. The number of measurement values which can be stored in the third storing area in the STR2_POST state is determined by the boundary peripheral value storage count which is set in the third storing area. In addition to the third storage timing signal, the first storage timing signal starts to be output in the predetermined cycle. Hence, at this point, the measurement values are stored in both the third storing area and the first storing area of the SRAM 114.

When the measurement values corresponding to the boundary peripheral value storage count are stored in the third storing area after the measurement value reaches the threshold data obtaining point 3, the boundary peripheral value generation circuit 122 changes the boundary peripheral value control circuit 113 from the STR2_POST state to the STR0_PRE state. Then, the boundary peripheral value generation circuit 122 disables the third storage timing signal 309, thereby stopping storage in the third storing area. Subsequently, every time the threshold obtaining point occurs, the aforementioned processing will be repeated. That is, when the measurement value reaches each of the threshold data obtaining points, and the measurement values corresponding to the boundary peripheral value storage count have been stored after the measurement value changes across the threshold, it triggers the boundary peripheral value generation circuit 122 to change the state of the boundary peripheral value control circuit 113. Then, the boundary peripheral value generation circuit 122 starts outputting the storage timing signal of the measurement value in accordance with each state to store the measurement value in a predetermined storing area of the SRAM 114. This arrangement makes it possible to store the measurement value necessary for analysis at each of the threshold data obtaining points even if the number of threshold data obtaining points is larger than that of the storing areas of the SRAM 114 in the measurement section for end portion detection.

FIG. 3B is a chart showing another example of the change in the measurement value. As shown in FIG. 3B, from the first threshold data obtaining point 1, for example, the measurement value in a section whose distance between the printhead 201 and the surface of the printing medium is constant indicates a constant value near the measurement value. If the distance between the printhead 201 and the surface of the printing medium greatly changes, the second threshold data obtaining point 2 occurs. Therefore, as shown in FIG. 3B, the first and the second threshold data obtaining points which occur a plurality of times have a large difference. In an ideal state in which there is no wrinkle or the like on the surface of the printing medium, the threshold data obtaining points may occur only twice (namely, one corresponds to the right end of the printing medium; and the other, the left end).

Figure 4:
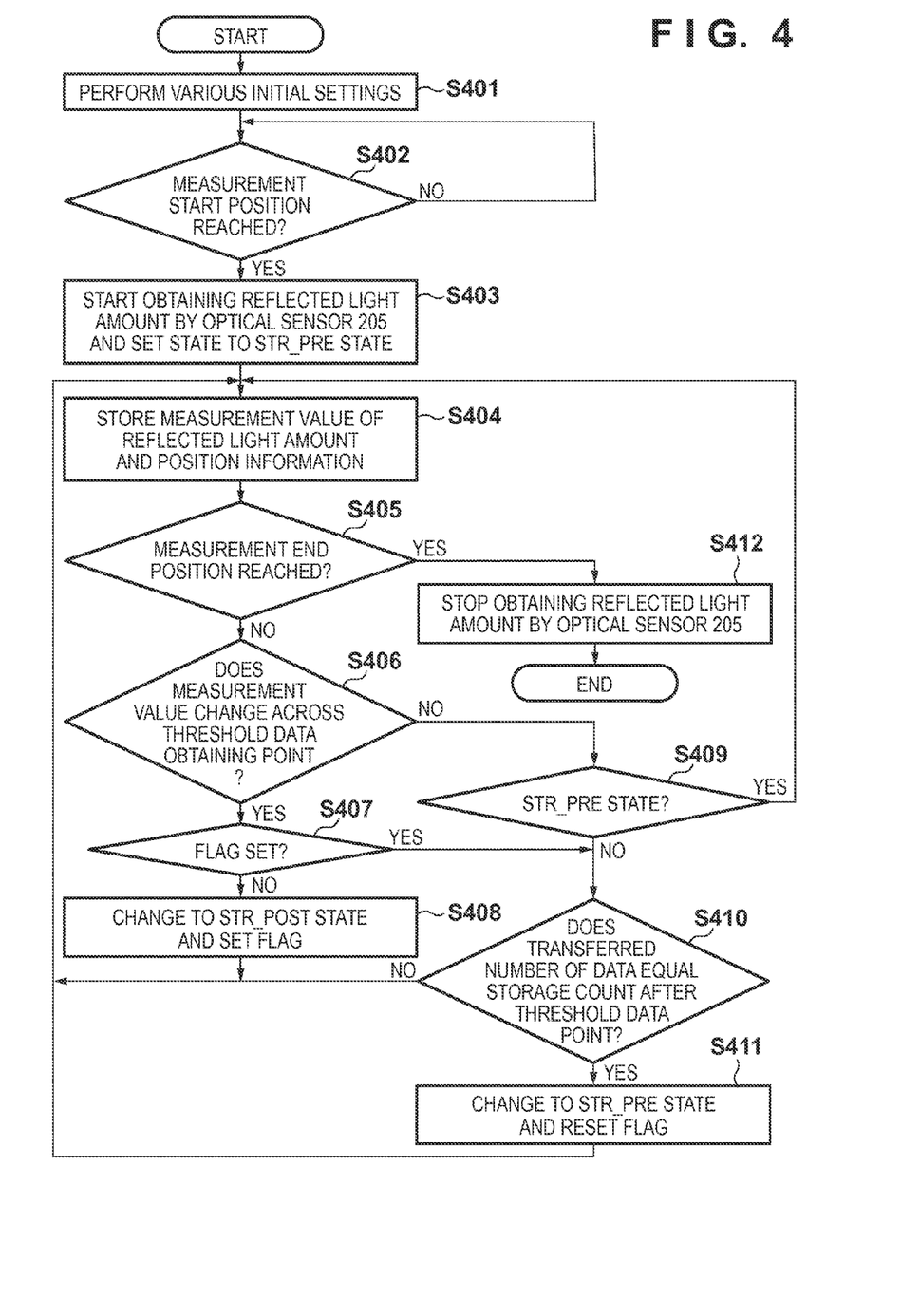
FIG. 4 is a flowchart for explaining a method of storing a boundary peripheral value.

FIG. 4 is a flowchart showing a procedure of storage control processing of the boundary peripheral value in the first embodiment. Note that the processing shown in FIG. 4 is implemented by executing a program stored in a ROM (not shown) by the ASIC 102.

First, upon starting printing processing in the inkjet printing apparatus 200, the CPU 101 sets the measurement section, the threshold, the threshold direction, the storage timing, and the boundary peripheral value storage count (step S401). Next, the apparatus main body driving circuit 111 drives the motor 115 to start scanning the carriage 202. At the same time, the measurement value obtaining circuit 121 starts inputting the position information from the encoder sensor 206. When the position information obtained by the measurement value obtaining circuit 121 from the encoder sensor 206 reaches a measurement start position (YES in step S402), the measurement value obtaining circuit 121 starts inputting the reflected light amount detected by the optical sensor 205 (step S403). Further, the boundary peripheral value generation circuit 122 sets the state of the boundary peripheral value control circuit 113 to the STR_PRE state (step S403). In FIG. 3A, for example, the state of the boundary peripheral value control circuit 113 is set to the STR0_PRE state.

The boundary peripheral value generation circuit 122 generates the first to the third storage timing signals 307 to 309 in response to the state transition signal 306 indicating the state of the boundary peripheral value control circuit 113 and the storage timing set by the CPU 101. Then, the boundary peripheral value generation circuit 122 outputs, to the memory control circuit 123, the measurement value together with the first to the third storage timing signals. The memory control circuit 123 stores the measurement value output from the boundary peripheral value generation circuit 122, as the boundary peripheral value, in the memory area corresponding to the SRAM 114 in response to the first to the third storage timing signals (step S404). Then, the measurement value obtaining circuit 121 determines whether a measurement end position has been reached each time it inputs the position information from the encoder sensor 206 (step S405). If NO in step S405, the process advances to step S406. On the other hand, if YES in step S405, the process advances to step S412. Then, the measurement value obtaining circuit 121 determines whether the measurement value has changed across the threshold data obtaining point (step S406). If YES in step S406, the measurement value obtaining circuit 121 determines whether a flag is set in step S407. If NO in step S406, the measurement value obtaining circuit 121 determines in step S409 whether the boundary peripheral value control circuit 113 is in the STR_PRE state. If NO in step S407, the measurement value obtaining circuit 121 notifies the boundary peripheral value generation circuit 122 of the detection of the change in measurement value across the threshold. Then, the boundary peripheral value generation circuit 122 changes the state of the boundary peripheral value control circuit 113 to the STR_POST state, and sets the flag. If YES in step S407, the process advances to step S410. If YES in step S409, the process returns to step S404. If NO in step S409, the process advances to step S410. In step S410, the boundary peripheral value generation circuit 122 determines, in the STR_POST state, whether the number of boundary peripheral values transferred to the memory control circuit 123 equals the storage count after the threshold data point set by the CPU 101. As described above, the storage count after the threshold data point is four. If YES in step S410, the boundary peripheral value generation circuit 122 changes the state of the boundary peripheral value control circuit 113 to the STR_PRE state, and resets the flag (step S411). If NO in step S410, the process returns to step S404.

In FIG. 3A, for example, the processing in steps S404 to S406, and step S409 are performed until the measurement value changes across the threshold data obtaining point 1. After the measurement value changes across the threshold data obtaining point 1, the processing in steps S404 to S408 is performed, and the state of the boundary peripheral value control circuit 113 changes to the STR0_POST state. Subsequently, the processing in steps S404 to S407, and step S410 is repeatedly performed until YES is obtained in step S410. In YES in step S410, the state of the boundary peripheral value control circuit 113 changes to the STR1_PRE state. Again, the processing in steps S404 to S406, and step S409 is performed until the measurement point changes across the threshold data obtaining point 2. By changing the state in the same manner as described above, the state of the boundary peripheral value control circuit 113 changes as shown in FIG. 3A.

In step S412, the measurement value obtaining circuit 121 stops inputting the reflected light amount from the optical sensor 205.

Various pieces of information are obtained by analyzing the boundary peripheral values stored in the SRAM 114. Assume that the boundary peripheral values have a measurement value distribution as shown in FIG. 3B as an example. In this case, from the measurement value distribution before and after the threshold data obtaining point 1, it is possible to detect that the optical sensor 205 moves from the platen 208 onto the printing medium (the end portion of the printing medium). Moreover, from the measurement value distribution before and after the threshold data obtaining point 2, it is possible to detect that the reflected light amount greatly changes again, and determine that there is damage to the printing medium such as a stain, tear, and wrinkle, or a frame line or the like is printed near the end portion. Furthermore, from the position information at the threshold data obtaining points 1 and 2, the distance between them may be detected, thereby judging the state of the printing medium based on the magnitude of the distance. For example, when the distance between them is smaller than the threshold, it may be judged as an error. The CPU 101 and the ASIC 102 control the operation of the printing apparatus based on the above-described determination result. The CPU 101 and the ASIC 102, for example, discharge the printing medium and notify the user if the damage to the printing medium is serious, and perform a printing operation by the printhead if there is no damage to the printing medium.

Figure 5A:
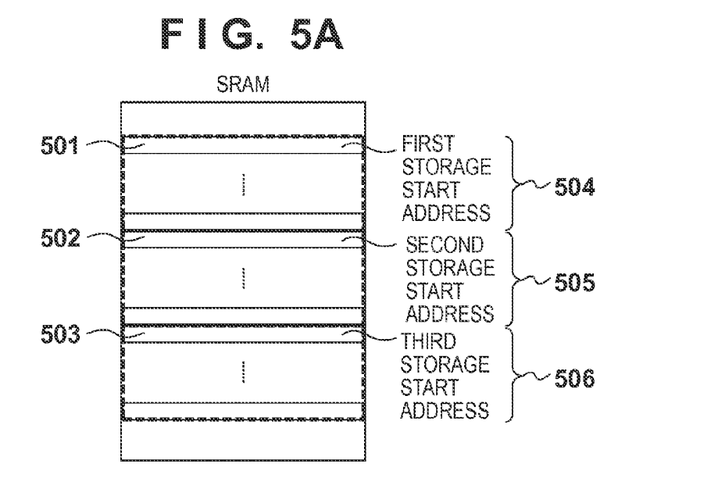
FIGS. 5A to 5E are views showing the procedure of storage control processing of the boundary peripheral value.

FIGS. 5A to 5E are views for explaining a storage control method of the boundary peripheral value in the SRAM 114. FIG. 5A shows a first storing area (first memory area) 504 of the SRAM 114, a second storing area (second memory area) 505, and a third storing area (third memory area) 506. Start addresses 501, 502, and 503 of the respective storing areas are set by the CPU 101. The end address of each area is decided by the boundary peripheral value storage count set in each area.

Figure 5B:
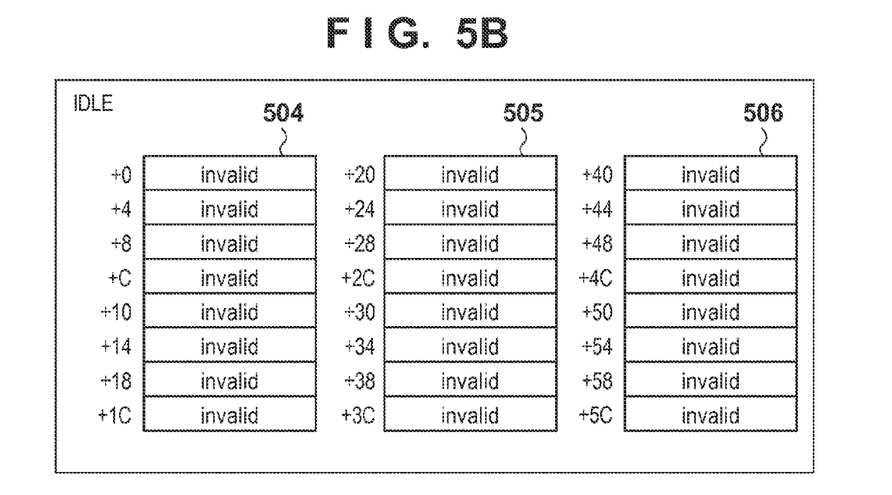
Figure 5C:
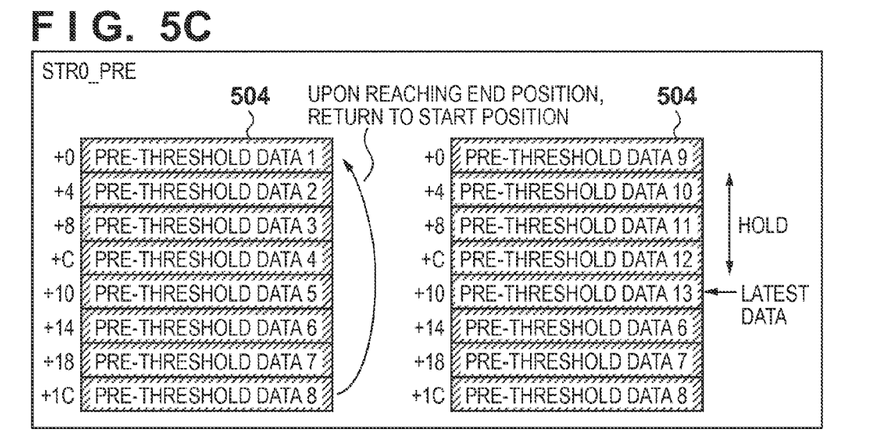

In FIGS. 5A to 5E, assume that the SRAM 114 is in a 32-bit aligning arrangement, the boundary peripheral value storage count is four, the first storage start address is +0h, the second storage start address is +20h, and the third storage start address is +40h. Assuming that the boundary peripheral value storage counts stored before and after the threshold data obtaining point are equal, and for example, the storage count before the threshold data obtaining point is four and that after the threshold data obtaining point is four. That is, as shown in FIG. 5B, the end address of the first storing area 504 is +1Ch, the end address of the second storing area 505 is +3Ch, and the start address of the third storing area 506 is +5Ch. As described above, the first storing area 504, the second storing area 505, and the third storing area 506 can respectively store the measurement values of the first count (eight in this example).

FIG. 5B shows a state of each storing area when the boundary peripheral value control circuit 113 is in the IDLE state. In the IDLE state, as shown in FIG. 5B, invalid data are stored in the first to the third storing areas 504 to 506.

When measurement falls within the measurement section in step S402, and the boundary peripheral value control circuit 113 is in the STR0_PRE state, the measurement values are sequentially stored, as the boundary peripheral values before the threshold data obtaining points, from the start address 501 of the first storing area 504 in response to the first storage timing signal 307. The boundary peripheral value before the threshold data obtaining point is also referred to as pre-threshold data hereinafter. As in the first storing area 504 of FIG. 5C, the pre-threshold data input in a state in which the pre-threshold data have already been stored up to the end address are sequentially stored from the start address 501 again. Hence, in the STR0_PRE state, a maximum of eight pre-threshold data including new one can always be stored.

Figure 5D:
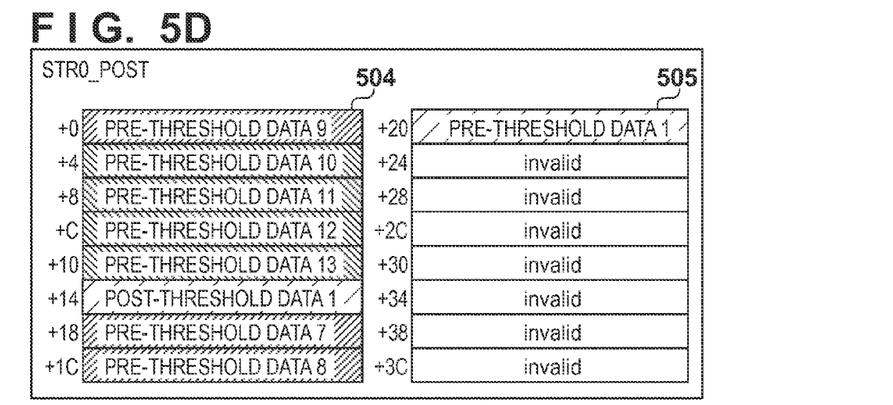

FIG. 5D shows the first storing area 504 and the second storing area 505 when the boundary peripheral value control circuit 113 changes from the STR0_PRE state to the STR0_POST state. In the STR0_POST state, the boundary peripheral value control circuit 113 operates so that new four data including pre-threshold data 13 as the latest data (namely, pre-threshold data 10 to 13) are held as the pre-threshold data. Therefore, the next address of the latest data (+14h in this example) when the measurement value changes across the threshold data obtaining point and the number of pre-threshold data (four in this example) are held. The number of pre-threshold data can be smaller than the boundary peripheral value storage count depending on the setting relationship between the threshold data obtaining point and the boundary peripheral value storage count. Therefore, the number of pre-threshold data and the next address of the latest data are held to identify a valid data range within the storing area.

In FIG. 5D, the boundary peripheral value is stored, as post-threshold data 1, at the address +14h in which pre-threshold data 6 of the first storing area 504 has been stored by the first storage timing signal 307 and the second storage timing signal 308. The post-threshold data 1 is also stored at the start address +20h of the second storing area 505.

Figure 5E:
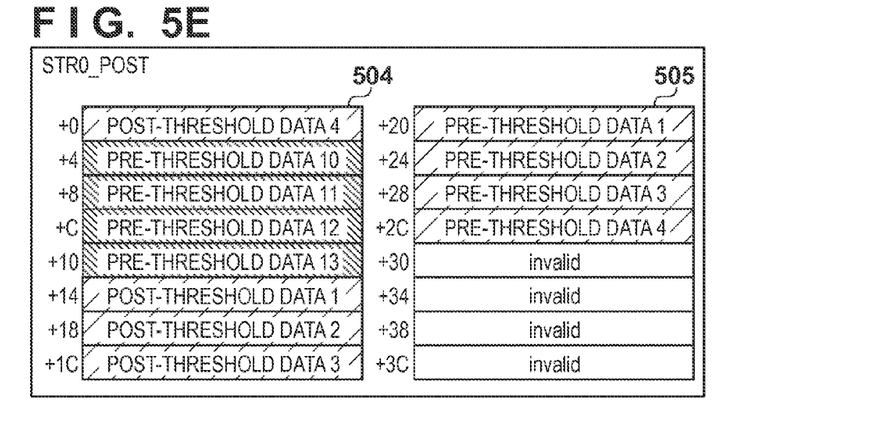

FIG. 5E shows the first storing area 504 and the second storing area 505 when the boundary peripheral values corresponding to the boundary peripheral value storage count are stored in the STR0_POST state. In the first storing area 504, four pre-threshold data and four post-threshold data centering on the threshold point obtaining point, that is, the pre-threshold data 10 to 13 and the post-threshold data 1 to 4 are stored. In the second storing area 505, four pre-threshold data, that is, the pre-threshold data 1 to 4 are stored. As described above, after the event occurs, the second count (four in this example) of the measurement values is stored in the first storing area 504 and the second storing area 505. This second storing area 505 is a storing target area next to the first storing area 504.

After obtaining the post-threshold data corresponding to the boundary peripheral value storage count, the boundary peripheral value control circuit 113 changes from the STR0_POST state to the STR1_PRE state, and new pre-threshold data is stored in the second storing area 505 in response to the second storage timing signal 308. In this case, the new pre-threshold data are sequentially stored from a next address (+30h) at the end of the STR0_POST state. After the pre-threshold data are stored up to the address +3C, the pre-threshold data are sequentially stored from the second storage start address 502. The boundary peripheral value control circuit 113 changes to the STR1_POST state at the subsequent threshold data obtaining point 2, and the STR2_POST state at the threshold data obtaining point 3. Likewise, in the changes to the STR1_POST state and the STR2_POST state, the number of pre-threshold data and the next address of the latest data are held.

The operations in the STR1_POST state and the STR2_POST state are the same as in the STR0_POST state. More specifically, in the STR1_POST state, the same data is stored in the second storing area 505 and the third storing area 506, and in the STR2_POST state, the same data is stored in the third storing area 506 and the first storing area 504. In this way, it is configured to cyclically store the measurement value in each storing area for each threshold data obtaining point. In this case, even though the boundary peripheral value at the first threshold data obtaining point 1 is overwritten, the boundary peripheral values at before and after the second and the third threshold data obtaining points 2 and 3 are respectively stored in the second storing area 505 and the third storing area 506. However, as long as a readout operation from the SRAM 114 is performed by the time the boundary peripheral value at the threshold data obtaining point 1 is overwritten, as will be described, the threshold data obtaining point can be analyzed. A supplementary explanation is given to a read control of the boundary peripheral value stored in the SRAM 114. The boundary peripheral value stored in the SRAM 114 may be read in, for example, step S411 of FIG. 4. In this example, after the completion of storing the post-threshold data at the threshold data obtaining point 1, the pre-threshold data and the post-threshold data at the threshold data obtaining point 1 are read. A readout operation at another threshold data obtaining point is performed in the same manner as described above.

As described above, according to the first embodiment, all measurement values in the measurement range where the end portion of the printing medium is detected need not be held, thereby reducing a capacity for storing the measurement values. Note that the number of storing areas allocated to the SRAM 114 is not limited to three. For example, as long as the pre-threshold data and the post-threshold data can be read (as long as there is sufficient time) until the data are overwritten next time after the pre-threshold data and the post-threshold data are stored, the number of storing areas may be two. Note that if the data at the threshold data obtaining point can be overwritten, the readout operation from the storing area allocated to the SRAM 114 is performed in the step next to step S412 in FIG. 4, and then an analysis is performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125007, filed Jun. 13, 2013, which is hereby incorporated by reference herein in its entirety.

What is claimed is:

1. A measuring method comprising:
  measuring a target with a sensor by effecting relative movement between the target and the sensor;
  storing, at a predetermined timing interval, a measurement value of the target in a first area allocated in a memory;
  changing an area in which the measurement value of the target is to be stored from the first area to a second area different from the first area, in a case where an event that the measurement value substantially varies occurs;
  continuing, for a predetermined number of times, storing the measurement value in the first area even after an area in which the measurement value of the target is to be stored is changed, wherein the predetermined number of times is less than a maximum number of sub-areas of the first area in which the measurement value can be stored; and determining a status of the target based on the measurement value stored in the memory.

2. The method according to claim 1, wherein the event is that the measurement value surpasses a predetermined value or falls below the predetermined value.

3. The method according to claim 1, wherein, in a case where the measurement value is stored in the first area a number of times which is more than the maximum number, the measurement value is stored in the sub-areas of the first area in a cyclic manner.

4. The method according to claim 1, wherein, in a case where the event occurs while the measurement value is stored in the second area, the area in which the measurement value of the target is to be stored is changed from the second area to the first area or a third area, wherein the third area is different from the first and second areas, and wherein the measurement value is continued to be stored in the second area for the predetermined number of times after an area in which the measurement value of the target is to be stored is changed.

5. The method according to claim 1, wherein position information of the sensor is stored with the measurement value in the memory.

6. The method according to claim 1, wherein the sensor is provided on a carriage moving with a printhead mounted on the carriage, and the sensor measures a light amount reflected from a printing medium as the target.

* * * * *